Patented Oct. 28, 1924.

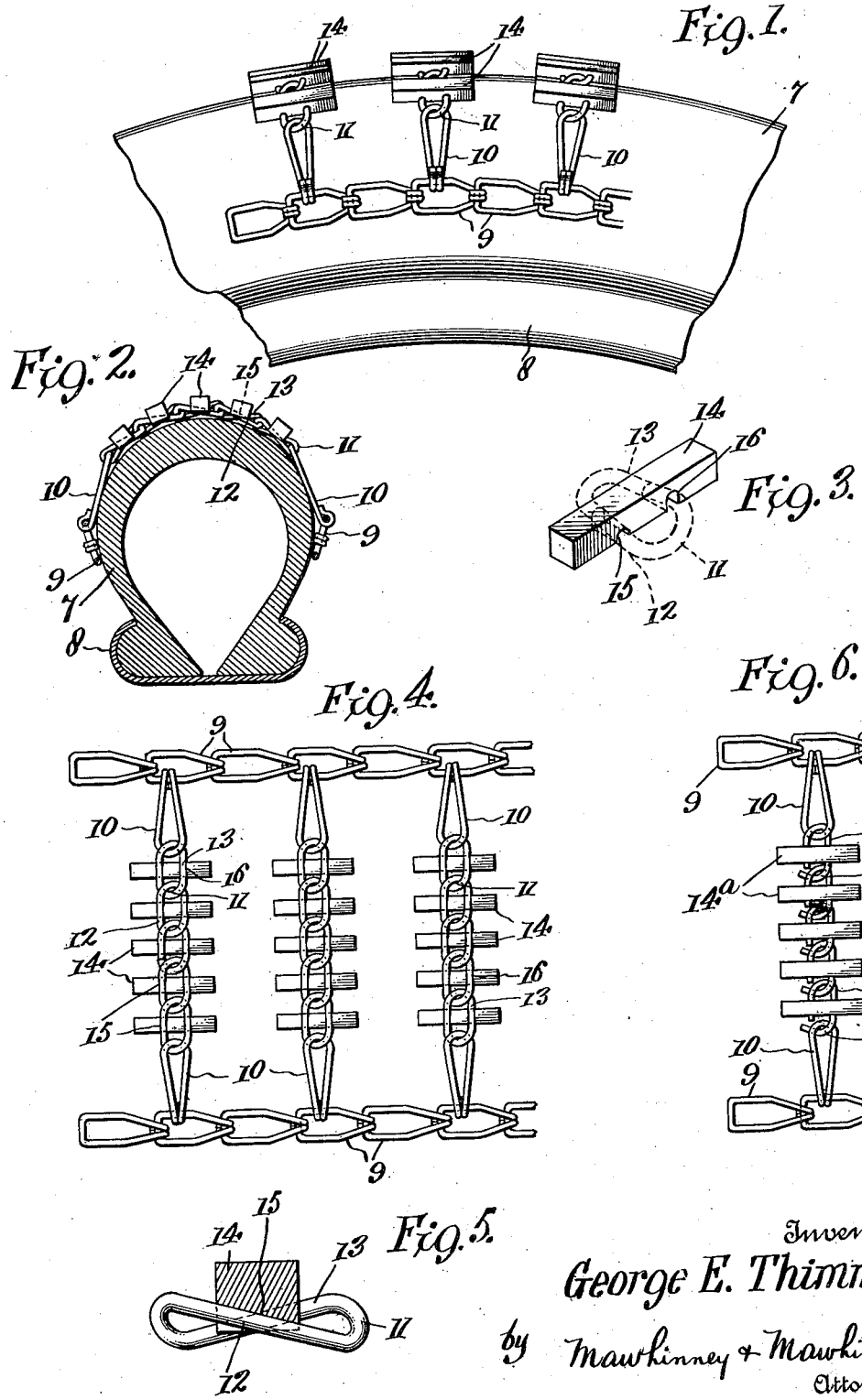

1,513,679

UNITED STATES PATENT OFFICE.

GEORGE E. THIMMES, OF MECHANICSVILLE, IOWA.

NONSKID AUTOMOBILE CHAIN.

Application filed July 23, 1924. Serial No. 727,733.

*To all whom it may concern:*

Be it known that GEORGE E. THIMMES, a citizen of the United States, residing at corner of First and Linn Streets, Mechanicsville, in the county of Cedar and State of Iowa, has invented certain new and useful Improvements in Nonskid Automobile Chains, of which the following is a specification.

The present invention relates to improvements in non-skid automobile chains and has for an object to provide an improved chain adapted to be applied to the rubber tires of automobiles or like vehicles to avoid skidding on wet and slippery streets and roads.

The invention has for a further object to provide a device that is adapted to exert a high tractive effort in mud or slippery places.

The invention further consists in certain improvements in the construction of the cross chain involving improved links with anti-skid bars thereon.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a fragmentary side view of a vehicle tire showing the invention applied thereto.

Figure 2 is a cross section through the same.

Figure 3 is a perspective view of one of the links and bars.

Figure 4 is an inside plan view of part of a chain made in accordance with the invention.

Figure 5 is a cross section through one of the bars showing the application of the link thereto, and Figure 6 is a fragmentary inner plan view of a modification in which the links are left open.

Referring more particularly to the drawings 7 designates a vehicle tire shown as mounted on the rim 8, and 9 represents the ordinary side chains.

The improvement consists in the cross chains which are coupled to the side chains by the use of links 10 in a well known manner. The intermediate portions of the cross chains are made up of links 11 having sides 12 and 13 spaced equi-distantly apart throughout their lengths but inclining in relatively opposite directions with the intermediate portions crossing one another as indicated in Figure 5.

The end portions of the links 11 are thus inclined similarly in relatively opposite directions. The construction of the link adds materially to the strength of the sides and ends thereof and it enables the free connection of the links while the anti-skid bars 14 lie parallel with one another and with their outer surfaces substantially flat with the surface of the roadway.

The bars 14 are of solid construction and are of suitable length, depth and thickness with grooves 15 and 16 in their lower edges spaced apart and inclining in depth from one side of the bar to the opposite side, this inclination of depth taking place in opposite directions relatively for the two grooves, so that the two oppositely inclined side portions 12 and 13 of the link may be received therein. The bar and sides of the link are soldered, welded or otherwise secured together in an adequate way to withstand the shocks and strains of road travel.

In accordance with the modification shown in Figure 6 the bars 14$^a$ are made with integral half links 17 and 18, the half links at one side being open initially in order to receive the closed half link 17 of the adjoining bar. Figure 6 shows the condition of the parts after the open links 18 have been engaged with the closed half links 17. The separated ends of the open links are brought together and welded or otherwise secured in order to make a permanent fastening.

In the use of the device the bars 14 extend as to their length circumferentially of the wheel or longitudinally with respect to the direction of travel and they present elongated side edges to avoid lateral skidding while they also present substantial end surfaces to catch in mud, snow and other slippery places to secure a high tractive effect.

It is obvious that various changes and modifications may be made in the details of construction and design of the above specifically described embodiment of this invention without departing from the spirit there- 01, such changes and modifications being restricted only by the scope of the following claim.

What is claimed is:—

A cross chain comprising links having spaced side portions inclined in relatively opposite directions with end portions also inclined in relatively opposite directions and joining the extremities of said side portions, and narrow elongated bars of substantially rectangular cross section having spaced grooves extending cross-wise of the bars, said grooves being upon the inner surfaces of the bars and opening through said bottom edges, said grooves being inclined in relatively opposite directions whereby to receive the side portions of said chain links, said side portions being welded in said grooves, said bars extending as to length substantially in the same direction with the circumference of the tire on which the cross chain is used.

In testimony whereof I affix my signature.

GEORGE E. THIMMES.